(12) United States Patent
Schneider et al.

(10) Patent No.: US 10,198,789 B2
(45) Date of Patent: Feb. 5, 2019

(54) OUT-OF-ORDER CACHE RETURNS

(71) Applicant: Advanced Micro Devices, Inc., Sunnyvale, CA (US)

(72) Inventors: Daniel Schneider, Sunnyvale, CA (US); Fataneh Ghodrat, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 86 days.

(21) Appl. No.: 15/377,998

(22) Filed: Dec. 13, 2016

(65) Prior Publication Data
US 2018/0165790 A1    Jun. 14, 2018

(51) Int. Cl.
| | | |
|---|---|---|
| G06T 1/60 | (2006.01) | |
| G06F 12/0815 | (2016.01) | |
| G06F 12/0877 | (2016.01) | |
| G06F 15/80 | (2006.01) | |
| G06T 15/00 | (2011.01) | |
| G06T 1/20 | (2006.01) | |

(52) U.S. Cl.
CPC ............ *G06T 1/60* (2013.01); *G06F 12/0815* (2013.01); *G06F 12/0877* (2013.01); *G06F 15/8007* (2013.01); *G06T 15/005* (2013.01); *G06F 2212/455* (2013.01); *G06F 2212/60* (2013.01); *G06F 2212/621* (2013.01); *G06T 1/20* (2013.01)

(58) Field of Classification Search
CPC .. G06T 1/20; G06T 1/60; G06T 15/04; G06T 15/80; G06F 12/0815; G06F 12/0877; G06F 15/8007; G06F 2212/455; G06F 2212/60; G06F 2212/621
USPC .............. 345/426, 582, 501, 503, 530, 557
See application file for complete search history.

(56) References Cited

U.S. PATENT DOCUMENTS

| | | | |
|---|---|---|---|
| 6,426,753 B1 | 7/2002 | Migdal | |
| 2005/0091460 A1 | 4/2005 | Rotithor et al. | |
| 2012/0110280 A1 | 5/2012 | Bryant | |
| 2013/0262776 A1* | 10/2013 | Asaro ..................... | G06F 12/08 711/135 |
| 2014/0156975 A1* | 6/2014 | Sridharan ............ | G06F 9/30021 712/227 |
| 2014/0223111 A1 | 8/2014 | Dinkjian et al. | |
| 2015/0134934 A1 | 5/2015 | Abdallah | |
| 2017/0032543 A1* | 2/2017 | Cho ....................... | G06T 15/04 345/582 |

* cited by examiner

*Primary Examiner* — Jacinta M Crawford
(74) *Attorney, Agent, or Firm* — Volpe and Koenig, P.C.

(57) ABSTRACT

Techniques for allowing cache access returns out of order are disclosed. A return ordering queue exists for each of several cache access types and stores outstanding cache accesses in the order in which those accesses were made. When a cache access request for a particular type is at the head of the return ordering queue for that type and the cache access is available for return to the wavefront that made that access, the cache system returns the cache access to the wavefront. Thus, cache accesses can be returned out of order with respect to cache accesses of different types. Allowing out-of-order returns can help to improve latency, for example in the situation where a relatively low-latency access type (e.g., a read) is issued after a relatively high-latency access type (e.g., a texture sampler operation).

20 Claims, 7 Drawing Sheets

OUT-OF-ORDER CACHE RETURNS

TECHNICAL FIELD

The disclosed embodiments are generally directed to graphics processing, and, in particular, to out-of-order cache returns.

BACKGROUND

Hardware for rendering three-dimensional graphics is highly parallel and includes a large number of individual processing units that request data from memory, perform calculations on the data, and provide processed data to a frame buffer for output to a screen. Accessing data in memory typically involves a large amount of latency. Cache systems are provided to reduce that latency. However, because of the large amount of data typically processed in rendering operations, additional improvements in memory access latency are desirable.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for allowing cache access returns out of order. More specifically, a return ordering queue exists for each of several cache access types and stores outstanding cache accesses in the order in which those accesses were made. Cache access types include a read type, a write type, and a texture sampler type. When a cache access request for a particular type is at the head of the return ordering queue for that type and the cache access is available for return to the wavefront that made that access, the cache system returns the cache access to the wavefront. This return is made without regard to the order of cache accesses of types other than the types associated with the return ordering queue storing the available cache access. Thus, cache accesses can be returned out of order with respect to cache accesses of different types. Allowing out-of-order returns can help to improve latency, for example in the situation where a relatively low-latency access type (e.g., a read) is issued after a relatively high-latency access type (e.g., a texture sampler operation).

Figure 1:
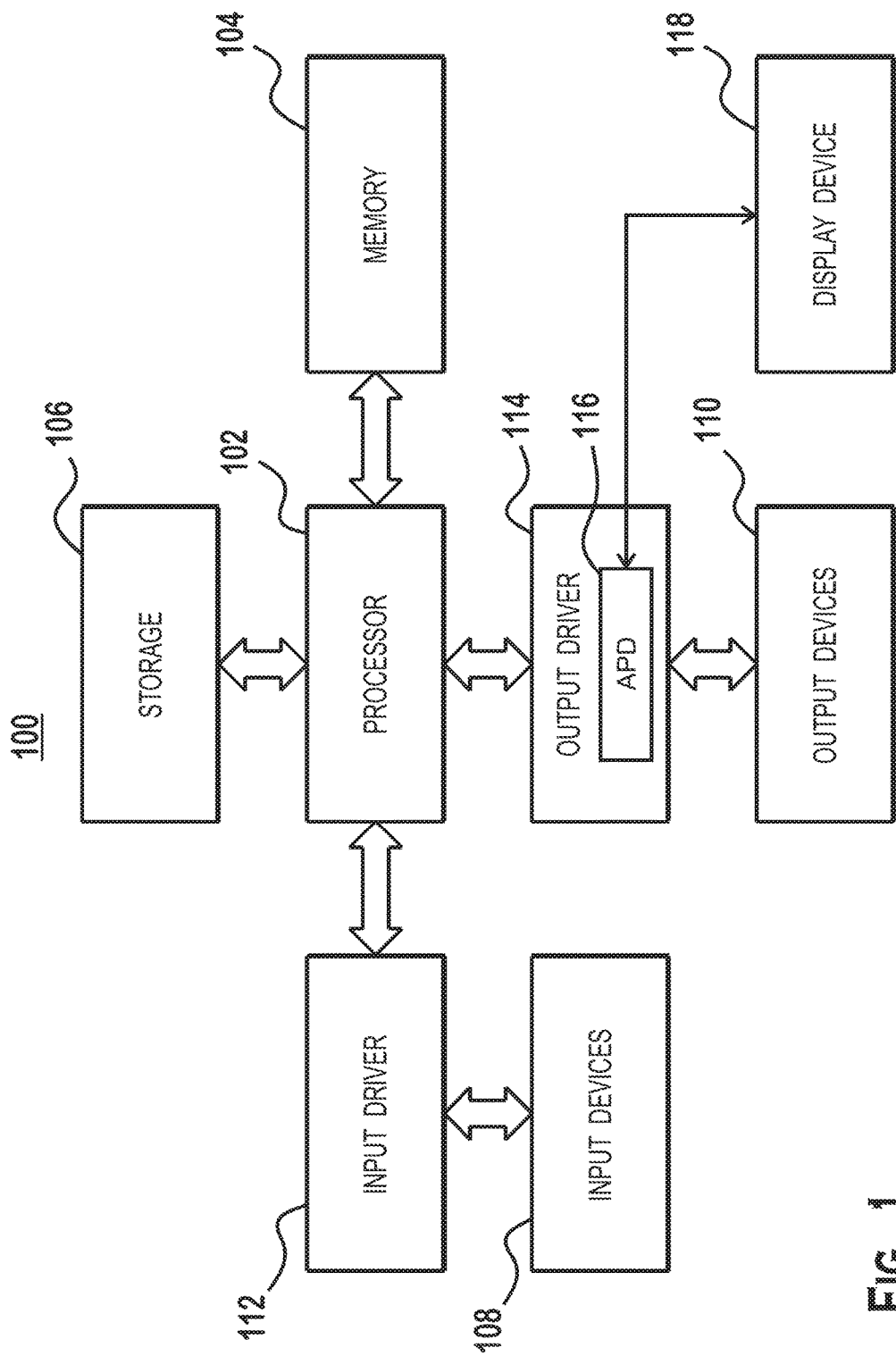
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
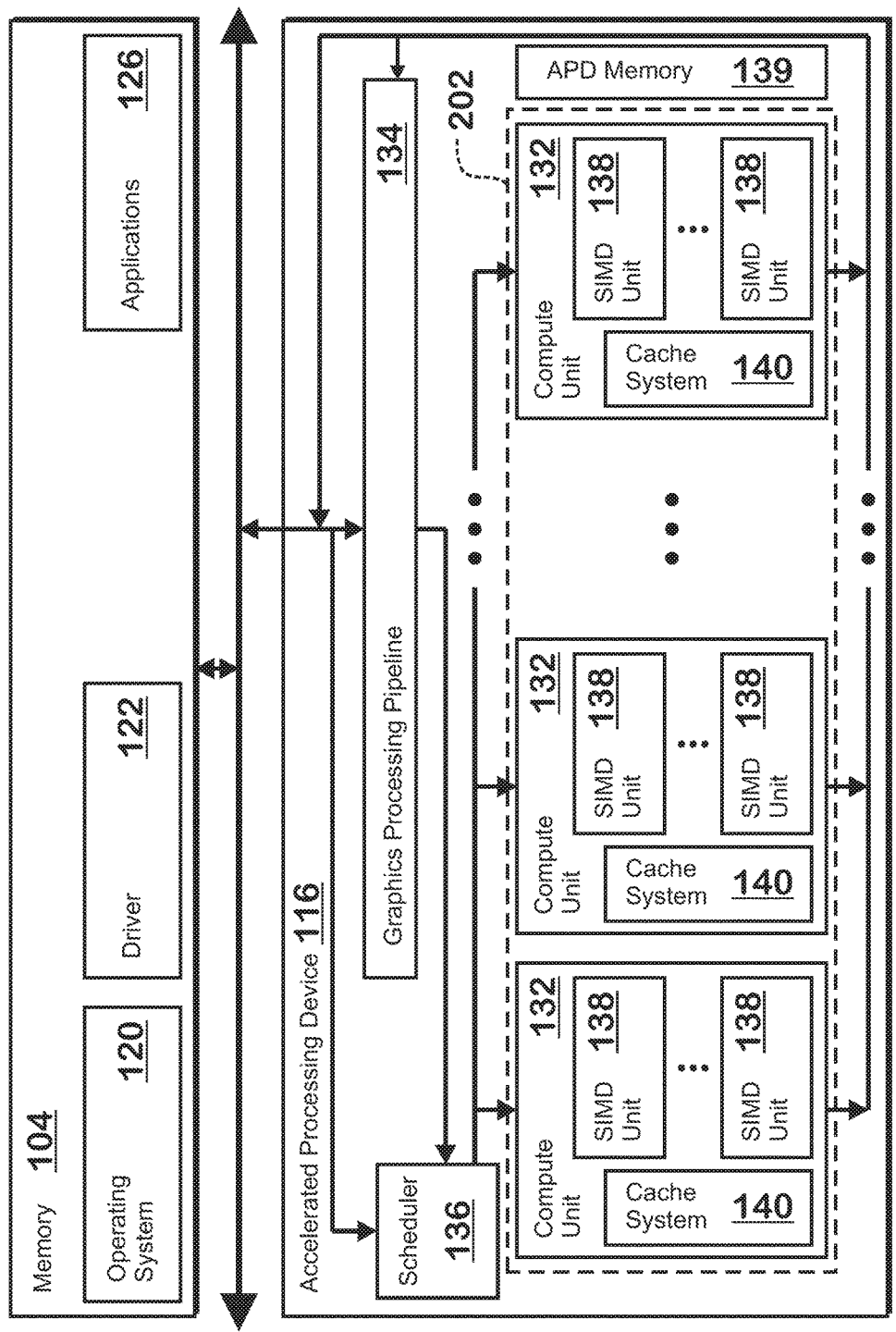
FIG. 2 is a block diagram illustrating an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed. The compute units 132 include cache systems 140 that cache data retrieved from memory, such as APD memory 139 within APD 116 or system memory 104.

The basic unit of execution in compute units 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138. Scheduling involves assigning wavefronts for execution on SIMD units 138, determining when wavefronts have ended, determining when wavefronts have stalled and should be swapped out with other wavefronts, and other scheduling tasks.

The parallelism afforded by the compute units 132 is suitable for graphics related operations such as pixel value calculations, vertex transformations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
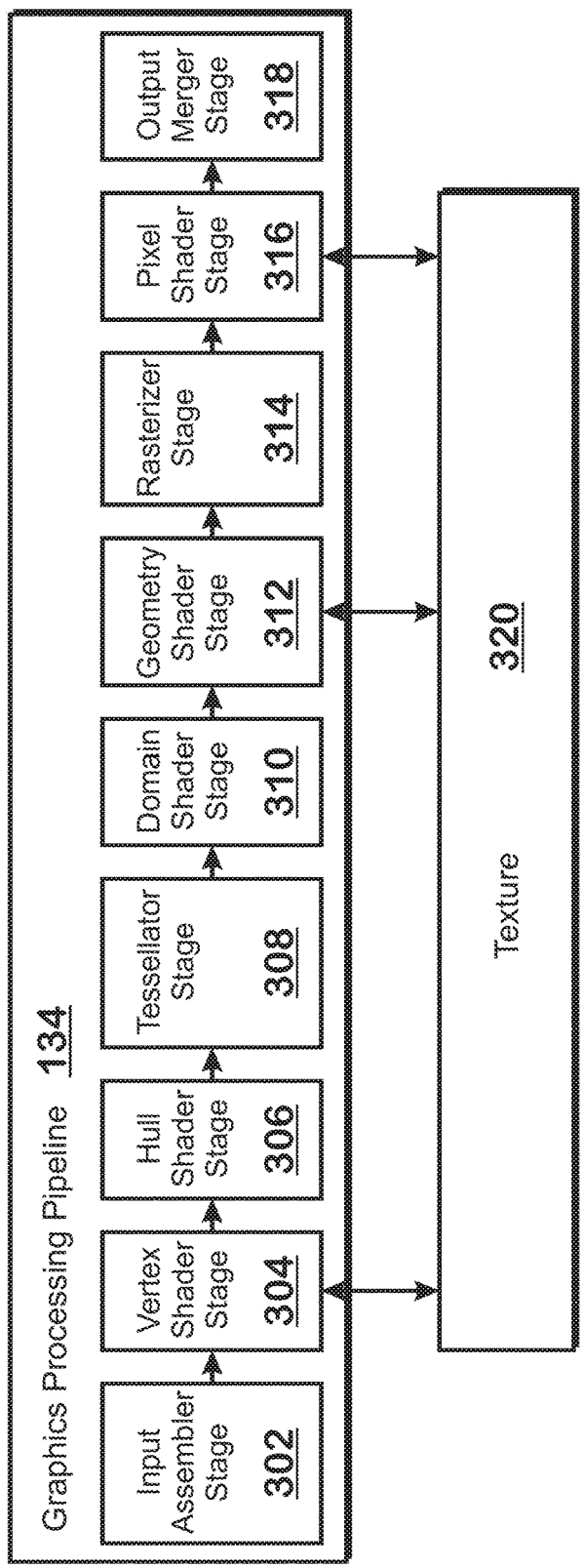
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 may modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
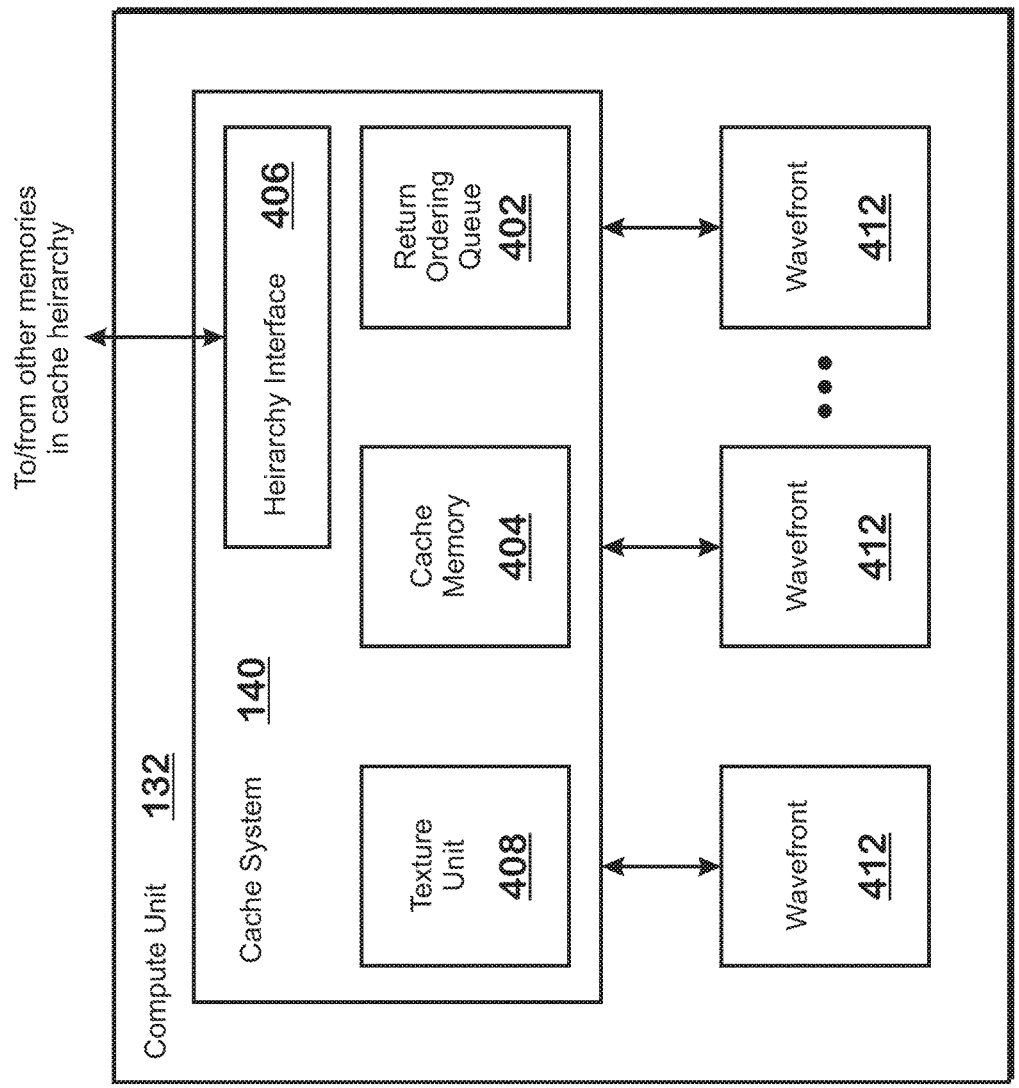
FIG. 4 is a block diagram illustrating a cache system according to an example.

FIG. 4 is an illustration of the cache system 140, according to an example. The cache system 140 receives requests for cache access from wavefronts executing in SIMD units 138 and processes those requests. Part of processing those requests involves searching for requested data in one or more cache memories 404 of the cache system 140 in the compute unit 132. More specifically, the cache system 140 has one or more cache memories 404 that act as a low level (such as a first level) of a cache hierarchy. If data requested to be accessed by a wavefront 412 does not exist in the cache memory 404, then the cache system 140 accesses other memories in the cache hierarchy (e.g., a higher level cache memory, an APD memory 139, and/or a system memory 104) via the hierarchy interface 406 to access the requested data.

In some examples, the requests for cache access are vector-based requests. Vector-based requests have the ability to request data from multiple memory locations, in line with parallelized operations on a SIMD unit 138. For example, a single instruction, such as a load instruction, executed by different work-items in a single wavefront, where each work-item specifies a different address, may result in reading from multiple locations in memory. Vector-based requests contrast with scalar requests, which generally read or write data to a single memory location.

A return ordering queue 402, in the cache system 140, orders completed cache accesses so that the completed cache accesses are returned to the wavefronts 412 in order. Returning accesses in order means providing return data to the wavefronts 412 that made the accesses in the order in which those accesses were made. In some examples, the cache system 140 orders cache access requests on a per-wavefront basis, meaning that indications of cache access requests made by a particular wavefront are stored in the order that wavefront 412 made those requests, but that the order of cache access requests made by different wavefronts 412 is not maintained. To accomplish this per-wavefront ordering of cache access requests, each wavefront 412 may be assigned its own set of queue memory space to maintain order of cache access requests.

The return ordering queue 402 stores an identifier for each cache access, where the identifiers are stored in the order in which the respective cache accesses are made by a wavefront 412. New entries—that is, entries corresponding to most-recently-made cache access requests from a wavefront 412—are provided to a tail of the return ordering queue 402. A head of the return ordering queue stores an identification of the oldest outstanding cache access request and thus the next cache access that is to be returned. When data for the access at the head of the return ordering queue 402 is available in the cache memory 404 (e.g., at least some of the data has been fetched from a higher level cache memory, system memory 104, or APD memory 139 to the cache memory 404), the cache system 140 provides that data to the requesting wavefront 412.

One technique for ordering cache returns involves ordering all cache returns regardless of the "type" of cache return. Herein, a cache return "type" (which is also a type of a cache access request) refers to one of a read type, a write type, or a texture sampler type. A read type access is an access that requests data from memory and for which the requested data is returned from memory. Read types accesses specify memory locations by virtual or physical address, and unlike sampler operations, do not specify texture coordinates. A return for a read type access means returning the requested data to the wavefront 412 that requested the data (e.g., placing the requested data into registers of the SIMD unit 138 that executes the wavefront 412 so that the SIMD unit 138 can execute instructions that depend on that data). For read type accesses, the return data is the data requested by the read type access request.

A return for a write type access means returning an "acknowledged" signal to the SIMD unit 138 that executes the wavefront 412 that requested the write. The "acknowledged" signal is a signal indicating to the SIMD unit 138 that requested the write that the write requested has been acknowledged by the memory system. Receiving the "acknowledged" signal allows the SIMD unit 138 to proceed with operations that are dependent on the "acknowledged" signal. For write type accesses, the return data is the "acknowledged" signal.

As with other operations, atomic operations (which may be complex operations such as read-modify-write operations) are classified as reads or writes based on the type of signal returned in response to completion of the operation.

More specifically, an atomic operation that returns data to a wavefront is classified as a read operation. An atomic operation that returns an acknowledgment signal to a wavefront is classified as a write operation.

A texture sampler type of memory operation is a complex operation that involves receiving a request for texture data, performing processing on the request to determine the stored data that is actually needed, fetching that stored data, optionally decompressing and/or filtering the stored data to obtain pixel or sample values, and returning the pixel or sample values to the SIMD unit 138 that executes the wavefront 412 that requested the data. A return for a texture sampler type access means returning the requested data to the SIMD unit 138 that executes the wavefront 412 that requested the data. For texture sampler type accesses, the return data is the pixel or sample values that are returned to the requesting SIMD unit 138.

Texture sampler operations have a large amount of latency because of the large number of operations involved. For example, requests for texture sample accesses typically include texture coordinates (u, v, w) that identify a location in the texture bitmap for which data is desired. Requests for texture sample accesses may also include one or more gradient values that specify the rate of change of the texture coordinates in comparison with the rate of change of the screen coordinates, and may include other data, such as data identifying a mipmap level, data identifying a cubemap face, or other data. Based on this data, a texture unit 408 of the cache system 140 identifies addresses at which the requested data is to be found, fetches the data from the memory system (which may include hitting in the cache memory 404 of the cache system 140 in the compute unit 132 or missing in the cache memory 404 and fetching missed data from other memories in the cache hierarchy to the cache memory 404), optionally decompresses the data, since texture data may be compressed, optionally processes the data according to a filtering scheme (e.g., bilinear filtering, trilinear filtering, anisotropic filtering), and transmits the data to the SIMD unit 138 that executes the wavefront 412 that made the texture sampler cache access request. These operations may take hundreds of computer clock cycles, which represents a large amount of latency (where latency is the time from when a SIMD unit 138 requests the texture sampling operation be performed to the time that the data obtained by the texture sampling operation is provided to the SIMD unit 138).

Because of the high latency of sampler operations as compared with read or write operations, other modes for ordering cache returns are provided herein. In these other modes instead of a single queue that orders all types of cache returns, the return ordering queue 402 includes two or more separate queues that maintain order of cache returns of different types. Several modes are possible. Selection between the different modes may be done responsive to a request from the processor 102, to an instruction executing in a SIMD unit 138, to an algorithmic determination made by firmware executing in the APD 116, or responsive to any other technically feasible mechanism.

In one mode, a queue is maintained for each of the "sampler," "read," and "write" types of cache access requests. Each queue stores indications of cache accesses of respective types. For example, the sampler queue maintains indications of access, in the order in which the accesses are made, of cache accesses of the sampler type but not of the read type or the write type. Similarly, the read queue maintains ordered indications of cache accesses of the read type but not of the write type or the sampler type and the write queue maintains ordered indications of cache accesses of the write type but not of the read type or the sampler type.

Each queue has a head and a tail. The head represents the oldest cache access request of the type associated with that queue and the tail represents the newest cache access request of the type associated with that queue. When all data for a cache access request at the head of a particular queue is stored in the cache memory 404 and is thus "available," the cache system 140 returns that data to a SIMD unit 138 for further processing. If cache accesses at the head of more than one queue are available, the cache system 140 can select any of the available cache accesses at the head of a queue, pursuant to any technically feasible arbitration scheme (e.g., round-robin), without regard to the order in which the cache accesses at the heads of the different queues were issued with respect to each other.

In another mode, one queue is maintained that orders sampler operations and read operations and another queue is maintained that orders write operations. In other words, a first queue stores indications of both the "read" type of cache access requests and the "sampler" type of cache access, in the order in which those access requests were received from a wavefront, and a second queue stores indications of the "write" type of cache accesses, in the order in which those access requests were received from a wavefront. Thus, read type cache accesses and sampler type cache accesses are ordered with respect to each other but not with respect to write type cache accesses and write type cache accesses are ordered with respect to each other but not with respect to read type cache accesses or sampler type cache accesses.

Other modes are also possible, such as one mode that has a queue that orders reads and writes and another queue that orders sampler operations, or another mode that has a queue that orders writes and sampler operations and another queue that orders reads.

Figure 5:
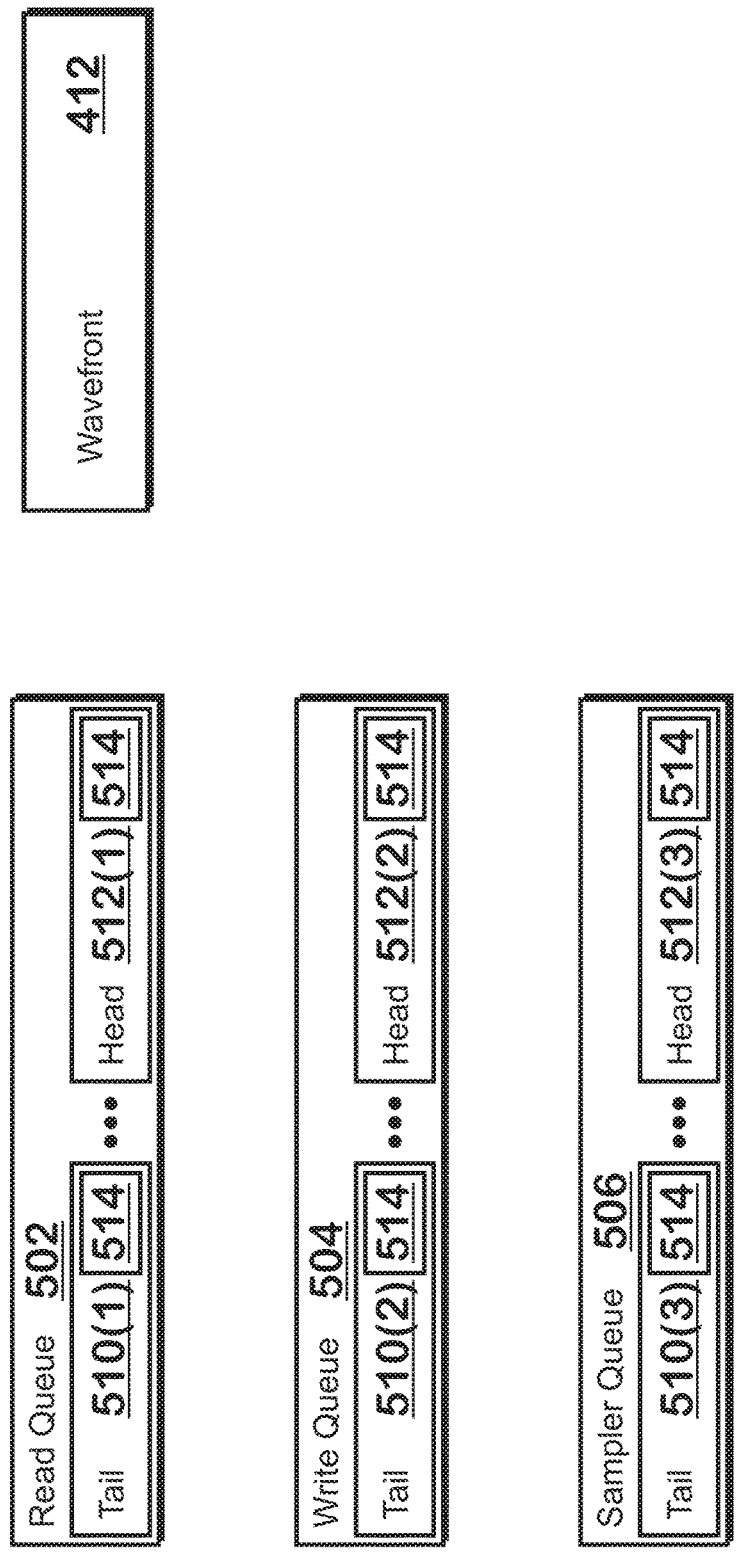
FIG. 5 is a block diagram that illustrates queues for ordering different types of cache access requests, according to an example.

FIG. 5 is a block diagram that illustrates queues for ordering different types of cache access requests, according to an example. The queues include a read queue 502 that stores entries 514 indicative of read-type cache access requests in the order in which those requests are made by a wavefront 412, a write queue that stores entries 514 indicative of write-type cache access requests in the order in which those requests are made by a wavefront 412, and a sampler queue 506 that stores entries 514 indicative of sampler-type cache access requests in the order in which those requests are made by a wavefront 412. Each entry 514 can store data for one or more cache access requests.

In operation, the wavefront 412 executes as part of a shader program that may include cache access requests. When such a request is made, the cache system 140 detects that request and determines whether the request is a read-type request, a write-type request, or a sampler type request. A read-type request is a request, other than a sampler-type request, that returns data from memory to the wavefront 412. A write-type request is a request that stores data in memory and returns an acknowledgment signal, but no data from memory, to the wavefront 412. A sampler-type request is a request that accepts at least texture coordinates, processes the coordinates and other data to identify one or more memory locations in memory that store texture data, retrieves the texture data, and returns the texture data to the wavefront 412.

Responsive to determining which type the cache access request is, the cache system 140 places an entry 514 indicative of the request in a tail 510 of the appropriate queue (e.g., read queue 502, write queue 504, or sampler queue 506). Entries 514 move towards the head 512 of each queue as other entries are removed from the head 512 of the queue due to data or a write acknowledgment for those entries 514 being returned to the wavefront 412. While the entry 514 indicative of the request is in the appropriate queue, the cache system 140 works to satisfy the request.

For read requests, the cache system 140 determines whether the data requested to be read is in the cache memory 404. If the data is in the cache memory 404, then the cache system 140 marks the corresponding entry 514 as "available," indicating that the appropriate cache return can be provided to the wavefront 412 when the entry 514 is at the head 512 of the read queue 502. If the data is not yet in the cache memory 404, then the corresponding entry 514 is not yet marked as available. The cache system 140 fetches the appropriate data from other levels of the cache hierarchy via the hierarchy interface 406. After fetching, when all data is available in the cache memory 404, the cache system 140 marks the entry 514 as available and returns the data to the wavefront 412 when the entry 514 is at the head 512 of the read queue 502.

For sampler requests, the cache system 140 performs appropriate processing on the sampler request to identify one or more memory addresses to satisfy the sampler requests. After the processing to identify the memory addresses for the sampler requests has completed, the cache system 140 determines whether the data for the sampler request is in the cache memory 404. If the data is in the cache memory 404, then the cache system 140 marks the corresponding entry 514 as available. If the data is not in the cache memory 404, then the corresponding entry 514 is not marked as available and the cache system 140 fetches the data from the cache hierarchy via the hierarchy interface 406. Responsive to the data for the sampler request being in the cache memory 404, the cache system 140 marks the corresponding entry 514 as available. When the corresponding entry 514 is marked as available and at the head 512 of the sampler queue 506, the cache system 140 returns the data for the sampler request to the wavefront 412.

For write requests, the cache system 140 writes data to the memory system. Specifically, the cache system 140 writes data to the cache memory 404. The data is subsequently written to other memories in the cache memory hierarchy via the hierarchy interface 406. Upon writing data to the cache memory 404 or to one or more of the other memories in the external cache memory reachable via the hierarchy interface 406 (for example, upon writing data to a cache memory that is one level up in the cache hierarchy from the cache memory 404), the cache system 140 marks the entry 514 corresponding to the written data as available. Responsive to an available entry 514 being at the head 512 of the write queue 504, the cache system 140 removes that entry 514 from the write queue 504 and returns an acknowledgment signal to the wavefront 412.

Figure 6:
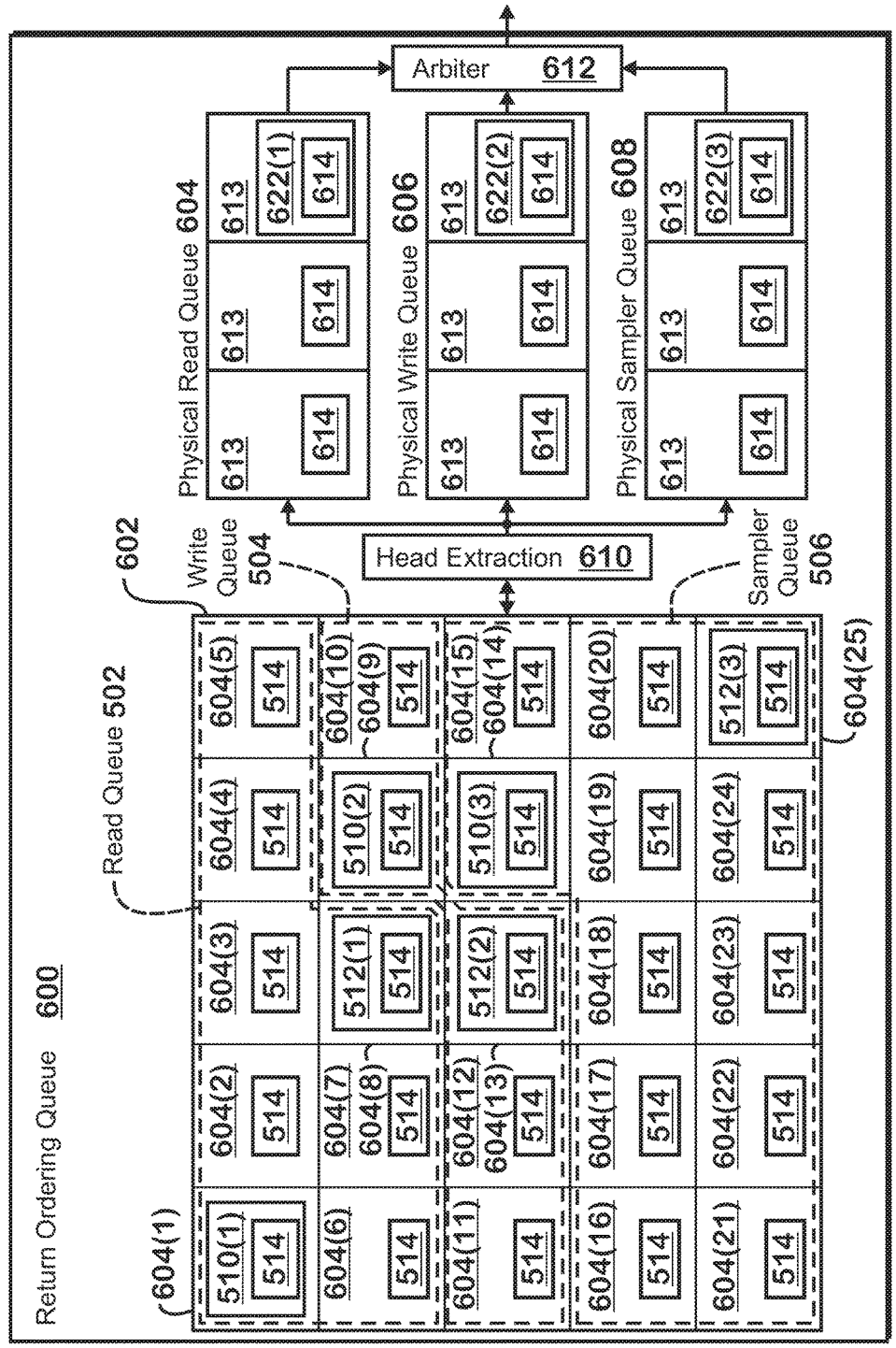
FIG. 6 is an illustration of a return ordering queue, according to an example.

FIG. 6 is an illustration of a return ordering queue 600, according to an example. The return ordering queue 600 is an example of the return ordering queue 402 of FIG. 4. The return ordering queue 600 includes a read queue 502, a write queue 504, and a sampler queue 506. Each of the read queue 502, the write queue 504, and the sampler queue 506 is implemented as a virtual queue inside a monolithic memory 602. The term "virtual queue" means that each of the read queue 502, the write queue 504, and the sampler queue 506 does not have a fixed location or length within the monolithic memory 602 as can begin or end at different slots 604 in the monolithic memory 602 (where the term "slot 604" refers to a unit of the monolothic memory 602 that is sized to store one entry 514). Although the different queues are shown back-to-back (e.g., with heads 512 in adjacent slots 604 to tails 510), the heads 512 of queues may sometimes not be adjacent to tails 510 of other queues. In one example, a read queue 502 is allocated a certain number of slots 604 in the monolithic memory 602 but the head 512(1) of the read queue 502 does not extend to the end of the allocated space. In such an example, the head 512(1) of the read queue 502 would not be adjacent to the tail 510(2) of the write queue 504. In another example, the tail 510 is not at the beginning of a particular queue. The cache system 140 may change the size of each virtual queue as needed, and, in certain circumstances, may allocate zero slots 604 to one or more queues. In one example, in a mode in which reads and sampler operations are ordered with respect to each other and writes are ordered with respect to each other but reads and sampler operations are not ordered with respect to writes, the cache system 140 allocates more than zero slots 604 for two queues (one for reads and sampler operations and another for writes) and allocates zero slots 604 for a third queue.

A head extractor 610 extracts data at the head of each of the queues that are active for the current mode and places that data in respective physical queues. The physical queues, which include a physical read queue 604, a physical write queue 606, and a physical sampler queue 608, allow for easily reading the head 512 of a particular queue by an arbiter 612 for provision to other portions of the cache system 140 for return to the wavefront 412. For example, without the physical queues, an arbiter would first look up the address of the head 512 of a queue and then obtain the data in the entry 514 corresponding to that head 512. With the head extractor 610 extracting the entries 514 at the head of each queue, the arbiter 612 examines a fixed memory location (the head of the physical queues) to obtain data for the next available cache memory access. The physical queues include one or more slots 613 for storing entries 614. The entries 614 in the physical queues include the same or similar data as the entries 514 in the virtual queues (e.g., read queue 502, write queue 504, and sampler queue 506 in the monolithic memory 602). The head 622 of each of the physical queues stores an entry 614 that has data from the entry 514 of the corresponding head 512 in the corresponding virtual queue.

The arbiter 612 selects an entry 614 from a head 622 of a physical queue when that entry 614 is marked as available. If multiple entries 614 at the heads 622 of different physical queues are marked as available, then the arbiter 612 applies any technically feasible arbitration scheme (such as round robin) to select one of the entries 614 at the heads 622 for cache return to a wavefront 412.

When the arbiter 612 reads an entry 614 from the head 622 of a physical queue, the physical queue moves the other entries 614 towards the head 622 and the head extractor 610 reads another entry 514 from a corresponding slot 604 in a corresponding virtual queue in the monolithic memory 602 and places a new entry 614 including data from the entry 514 read by the head extractor 610 into the newly vacated slot in the appropriate physical queue.

Figure 7:
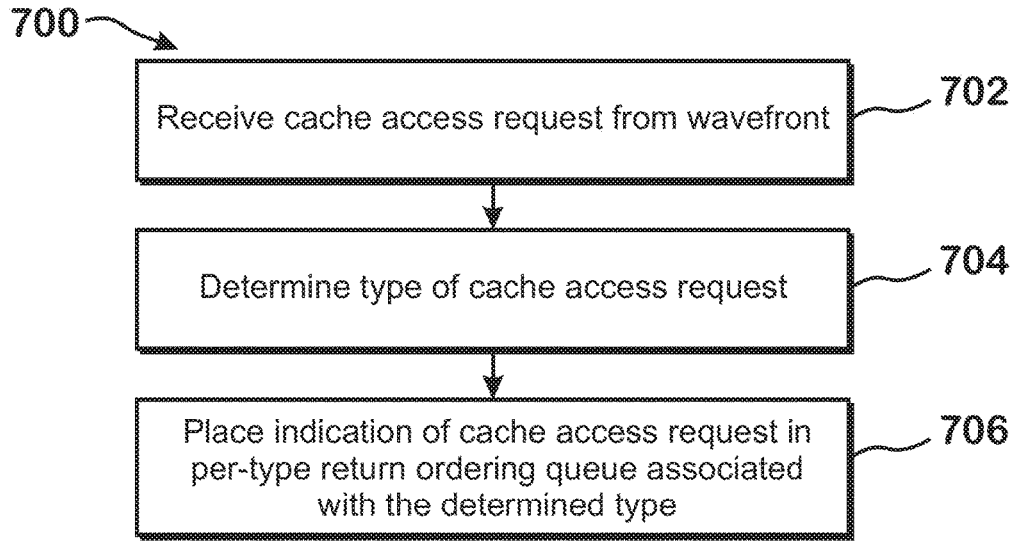
FIG. 7 is a flow diagram of a method for recording indications of cache access requests in per-access-type return ordering queues, according to an example.

FIG. 7 is a flow diagram of a method 700 for recording indications of cache access requests in per-access-type return ordering queues, according to an example. Although described with respect to the system shown and described with respect to FIGS. 1-6, it should be understood that any system configured to perform the method, in any technically feasible order, falls within the scope of the present disclosure.

As shown, a method 700 begins at step 702, where the cache system 140 receives a cache access request from a wavefront 412. The cache access request is a request to access memory via the cache system 140. At step 704, the cache system 140 determines which of a read type, a write type, or a texture sampler type the cache access request is. A read type is a type of access that reads data from one or more locations and returns the data to the wavefront 412 that made that access. A write type is a type of access that writes data to a particular location and returns an "acknowledged" signal to the wavefront 412 that made the access. A texture sampler type is a type of access that processes texture coordinates and possibly other texture-related input, identifies one or more memory addresses based on the texture coordinates and possibly other texture-related input, fetches data from the one or more memory addresses, optionally processes the data to decompress the data and/or filter the data (e.g., bilinear filtering, trilinear filtering, anisotropic filtering), and provides the fetched, processed texture data to the wavefront 412 that made the access.

At step 706, the cache system 140 places an indication of the cache access request in a per-type return ordering queue that is associated with the type. For example, if the cache access request is a write type, then the cache system 140 places an indication of that cache access request in a return ordering queue associated with the write type. Each queue maintains the cache access requests in the order in which the cache access requests are received. The oldest cache access request is at the head of the queue and the youngest cache access request is at the tail of the queue. Each queue can order requests of one, two, or three types depending on a mode set for the cache system 140.

Figure 8:
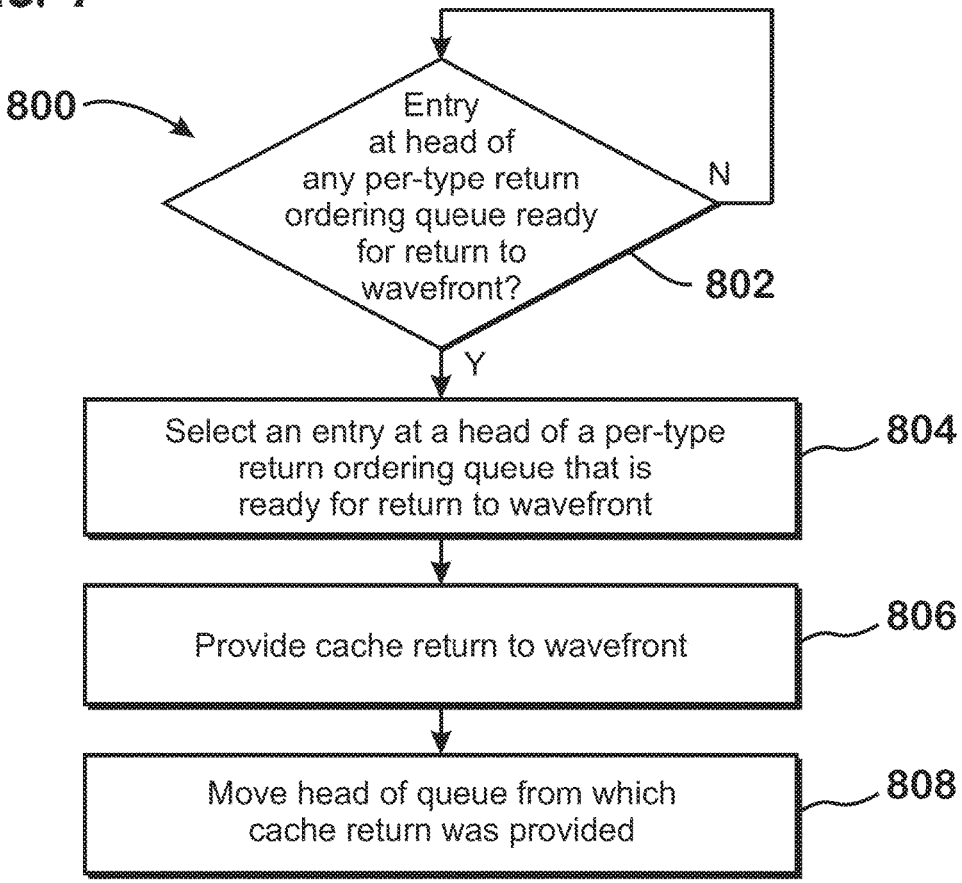
FIG. 8 is a flow diagram of a method for providing out-of-order cache returns to workgroups, according to an example.

FIG. 8 is a flow diagram of a method 800 for providing out-of-order cache returns to workgroups, according to an example. Although described with respect to the system shown and described with respect to FIGS. 1-6, it should be understood that any system configured to perform the method, in any technically feasible order, falls within the scope of the present disclosure.

As shown, the method 800 begins at step 802, where the cache system 140 determines whether an entry at the head of any of the per-type ordering queues is ready for return to the wavefront that made the associated cache access request. A read or sampler operation is ready if the data requested by the read or sampler operation is stored in the cache memory 404 of the cache system. In some examples, a write is ready if an acknowledgment has been received indicating that the data to be written has been guaranteed to be properly ordered with respect to other memory transactions, since at that point, other memory transactions would be able to "see" the effect of that write. In other examples, a write is ready if an acknowledgment has been received indicating that the data to be written has been stored in one or more memories at least one level above the cache memory 404 of the cache system 140 in the cache hierarchy.

At step 804, the cache system 140 selects an entry 514 at a head 512 of a queue that is ready for return to a wavefront 412. If multiple queues have heads 512 with ready entries 514, then the cache system 140 selects one of the entries 514 for return. This selection can be made based on any technically feasible arbitration scheme (e.g., round robin).

At step 806, the cache system 140 provides a cache return corresponding to the selected entry 514 to the wavefront 412 that requested the cache access. For reads and sampler operations, returns are the data requested. For writes, a return is an acknowledgment signal. At step 808, the cache system 140 removes the selected entry 514 from the queue that contained the selected entry 514 and modifies the queue so that the head 512 points to the next oldest entry 514.

The techniques described herein allow for wavefronts 412 to perform memory barrier operations on a per-access-type basis. Memory barrier operations are operations that cause a wavefront 412 to stall until returns have been received for all memory operations up to the barrier operation. The per-access-type basis queues and ordering allows wavefronts 412 to execute per-access-type barrier instructions. For example, a read-barrier would cause the wavefront 412 to wait for returns for all outstanding read operations to be received before proceeding, regardless of whether there are any outstanding write operations or sampler operations. Similarly, a write-barrier or a sampler-barrier would cause the wavefront 412 to wait for all outstanding writes or outstanding samplers to be received before proceeding.

The techniques described herein improve memory latency by providing modes in which memory access requests are ordered on a per-type basis but can be returned out of order across cache access types. Thus, cache accesses of a certain type (e.g., reads) do not have to wait for cache accesses of another type (e.g., texture sampler operations). This relaxation in ordering can reduce the latency of cache accesses, for example, if the latency of one type is greater than the latency of another type. In one example, a read operation has a relatively low latency and a texture sampler operation has a relatively higher latency. By allowing a cache return for a newer read operation before a cache access return for an older texture sampler operation, the latency of the read operation is reduced as compared with a situation in which the newer read operation would have to wait for the older texture sampler operation.

A method for performing out-of-order cache returns is provided. The method includes determining that a first entry at a head of a first return ordering queue of a plurality of return ordering queues is available for return to a wavefront, wherein the first entry corresponds to a first cache access request. The first return ordering queue stores entries for cache access requests of a first cache access type but not a second cache access type and a second return ordering queue, of the plurality of return ordering queues, stores entries for cache access requests of a second cache access type but not a first cache access type. The method also includes directing a cache return corresponding to the first entry to the wavefront, responsive to the determining, without waiting for cache access requests corresponding to entries in the second return ordering that are older than the first cache access request to become available for return to the wavefront.

A compute unit for performing out-of-order cache returns is provided. The compute unit includes a single-instruction-multiple-data unit configured to execute a wavefront and a cache system. The cache system is configured to store a plurality of return ordering queues that includes a first return ordering queue and a second return ordering queue, wherein the first return ordering queue stores entries for cache access requests of a first cache access type but not a second cache access type, and wherein the second return ordering queue stores entries for cache access requests of a second cache access type but not a first cache access type, determine that a first entry at a head of the first return ordering queue is available for return to the wavefront, wherein the first entry corresponds to a first cache access request, and direct a cache return corresponding to the first entry to the wavefront, responsive to the determining, without waiting for cache access requests corresponding to entries in the second return ordering that are older than the first cache access request to become available for return to the wavefront.

A computer system is also provided. The computer system includes an accelerated processing device including a compute unit and a processor configured to cause the accelerated processing device to execute a wavefront in the compute unit. The compute unit includes a single-instruction-multiple-data unit configured to execute the wavefront and a cache system. The cache system is configured to store a plurality of return ordering queues that includes a first return ordering queue and a second return ordering queue, wherein the first return ordering queue stores entries for cache access requests of a first cache access type but not a second cache access type, and wherein the second return ordering queue stores entries for cache access requests of a second cache access type but not a first cache access type, determine that a first entry at a head of the first return ordering queue is available for return to the wavefront, wherein the first entry corresponds to a first cache access request, and direct a cache return corresponding to the first entry to the wavefront, responsive to the determining, without waiting for cache access requests corresponding to entries in the second return ordering that are older than the first cache access request to become available for return to the wavefront.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing out-of-order cache returns, the method comprising:
   determining that a first entry at a head of a first return ordering queue of a plurality of return ordering queues is available for return to a wavefront, wherein the first entry corresponds to a first cache access request,
   wherein the first return ordering queue stores entries for cache access requests of a first cache access type but not a second cache access type, and
   wherein a second return ordering queue, of the plurality of return ordering queues, stores entries for cache access requests of the second cache access type but not the first cache access type; and
   directing a cache return corresponding to the first entry to be transmitted to the wavefront, responsive to the determining, without waiting for cache access requests corresponding to entries in the second return ordering queue that are older than the first cache access request to become available for return to the wavefront, wherein the cache return includes data indicative of a corresponding cache access request that has been completed.

2. The method of claim 1, wherein:
the first cache access type includes one of a read type, a write type, and a texture sampler type;
the second cache access type includes one of the read type, the write type, and the texture sampler type; and
the second cache access type is different than the first cache access type.

3. The method of claim 2, wherein:
the read type comprises an access type that requests data from a memory system and receives data in return;
the write type comprises an access type that writes data to the memory system and receives and acknowledgment signal in return; and
the texture sampler type comprises an access type that requests texture data via texture coordinates and receives the texture data in return.

4. The method of claim 3, wherein:
the texture sample type comprises an access type that requests one or more of converting the texture coordinates to one or more memory addresses, fetching data from the one or more memory addresses, decompressing the fetched data, and applying filtering to the fetched data.

5. The method of claim 1, further comprising:
selecting a mode for the plurality of return ordering queues, the mode defining a number of return ordering queues in the plurality of return ordering queues and one or more cache access types that are stored and ordered in each return ordering queue of the plurality of return ordering queues.

6. The method of claim 5, wherein:
the plurality of return ordering queues comprise virtual queues that are stored within a monolithic memory, wherein the virtual queues are resizeable to accommodate the selected mode.

7. The method of claim 6, further comprising:
copying entries from a head of each virtual queue to a head of corresponding physical queues,
wherein directing the cache return corresponding to the first entry to the wavefront comprises:
   removing an entry from a head of a physical queue that corresponds to the first return ordering queue,
   modifying a next-oldest entry of the physical queue to be at the head of the physical queue, and
   copying an entry from the first return ordering queue to the physical queue that corresponds to the first return ordering queue.

8. The method of claim 1, further comprising:
executing a cache access type-based barrier instruction in the wavefront.

9. The method of claim 8, wherein executing the cache access type-based barrier instruction comprises:
stalling the wavefront until outstanding cache accesses of a particular cache access type are completed.

10. A compute unit for performing out-of-order cache returns, the compute unit comprising:
a single-instruction-multiple-data unit configured to execute a wavefront; and
a cache system configured to:
store a plurality of return ordering queues that includes a first return ordering queue and a second return ordering queue, wherein the first return ordering queue stores entries for cache access requests of a first cache access type but not a second cache access type, and wherein the second return ordering queue stores entries for cache access requests of the second cache access type but not the first cache access type;
determine that a first entry at a head of the first return ordering queue is available for return to the wavefront, wherein the first entry corresponds to a first cache access request; and
direct a cache return corresponding to the first entry to be transmitted to the wavefront, responsive to the determining, without waiting for cache access requests corresponding to entries in the second return ordering queue that are older than the first cache access request to become available for return to the wavefront, wherein the cache return includes data indicative of a corresponding cache access request that has been completed.

11. The compute unit of claim 10, wherein:
the first cache access type includes one of a read type, a write type, and a texture sampler type;
the second cache access type includes one of the read type, the write type, and the texture sampler type; and
the second cache access type is different than the first cache access type.

12. The compute unit of claim 11, wherein:
the read type comprises an access type that requests data from a memory system and receives data in return;
the write type comprises an access type that writes data to the memory system and receives and acknowledgment signal in return; and
the texture sampler type comprises an access type that requests texture data via texture coordinates and receives the texture data in return.

13. The compute unit of claim 12, wherein:
the texture sample type comprises an access type that requests one or more of converting the texture coordinates to one or more memory addresses, fetching data from the one or more memory addresses, decompressing the fetched data, and applying filtering to the fetched data.

14. The compute unit of claim 10, wherein the cache system is further configured to:
select a mode for the plurality of return ordering queues, the mode defining a number of return ordering queues in the plurality of return ordering queues and one or more cache access types that are stored and ordered in each return ordering queue of the plurality of return ordering queues.

15. The compute unit of claim 14, wherein:
the plurality of return ordering queues comprise virtual queues that are stored within a monolithic memory, wherein the virtual queues are resizeable to accommodate the selected mode.

16. The compute unit of claim 15, wherein the cache system is further configured to:
copy entries from a head of each virtual queue to a head of corresponding physical queues,
wherein directing the cache return corresponding to the first entry to the wavefront comprises:
removing an entry from a head of a physical queue that corresponds to the first return ordering queue,
modifying a next-oldest entry of the physical queue to be at the head of the physical queue, and
copying an entry from the first return ordering queue to the physical queue that corresponds to the first return ordering queue.

17. The compute unit of claim 10, wherein the wavefront is configured to:
execute a cache access type-based barrier instruction.

18. The compute unit of claim 17, wherein:
in response to executing the cache access type-based barrier instruction, the wavefront is stalled until outstanding cache accesses of a particular cache access type are completed.

19. A computer system comprising:
an accelerated processing device including a compute unit; and
a processor configured to cause the accelerated processing device to execute a wavefront in the compute unit,
wherein the compute unit comprises:
a single-instruction-multiple-data unit configured to execute the wavefront; and
a cache system configured to:
store a plurality of return ordering queues that includes a first return ordering queue and a second return ordering queue, wherein the first return ordering queue stores entries for cache access requests of a first cache access type but not a second cache access type, and wherein the second return ordering queue stores entries for cache access requests of the second cache access type but not the first cache access type;
determine that a first entry at a head of the first return ordering queue is available for return to the wavefront, wherein the first entry corresponds to a first cache access request; and
direct a cache return corresponding to the first entry to be transmitted to the wavefront, responsive to the determining, without waiting for cache access requests corresponding to entries in the second return ordering queue that are older than the first cache access request to become available for return to the wavefront, wherein the cache return includes data indicative of a corresponding cache access request that has been completed.

20. The computer system of claim 19, wherein:
the first cache access type includes one of a read type, a write type, and a texture sampler type;
the second cache access type includes one of the read type, the write type, and the texture sampler type; and
the second cache access type is different than the first cache access type.

* * * * *